United States Patent Office 3,207,772
Patented Sept. 21, 1965

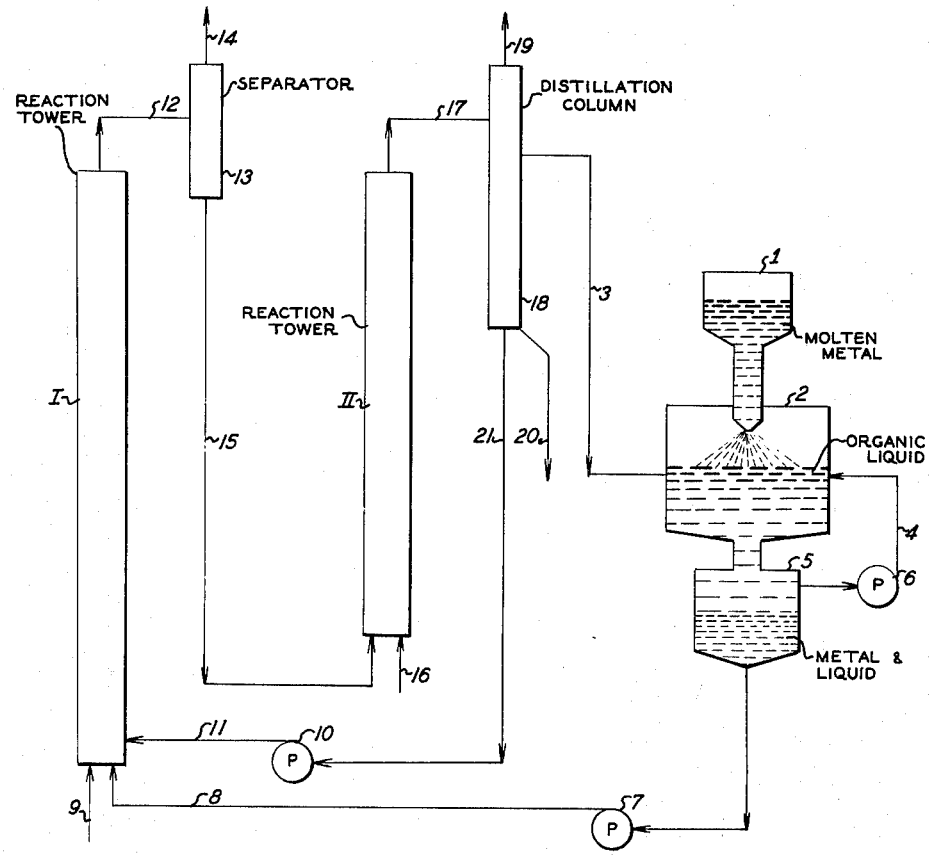

3,207,772
PRODUCTION OF ALKYL ALUMINUM COMPOUNDS
Karl Ziegler, Kaiser-Wilhelm-Platz 1, Mulheim (Ruhr), Germany, and Kurt Zosel, Mulheim (Ruhr), Germany; said Zosel assignor to said Ziegler
Continuation of application Ser. No. 706,807, Jan. 2, 1958, which is a division of application Ser. No. 573,470, Mar. 23, 1956. This application Jan. 17, 1962, Ser. No. 168,575
Claims priority, application Germany, Apr. 1, 1955, Z 4,843; May 25, 1955, Z 4,937
11 Claims. (Cl. 260—448)

This invention relates to new and useful improvements concerning the production of alkyl aluminum compounds and is a continuation of our copending application Serial No. 706,807, now abandoned, filed January 2, 1958, which is a division of copending application Serial No. 573,470 filed March 23, 1956.

Aluminum dialkyl hydride and aluminum trialkyl compounds are valuable products for organic synthesis or other reactions and notably as catalysts or catalyst components in the polymerization of olefins and especially of ethylene in accordance with the Ziegler method. The aluminum organic component, however, has been relatively difficult and costly to obtain. Though an improvement in this respect has been achieved by the copending application U.S. Serial No. 484,576, which has issued to Patent No. 3,032,574, May 1, 1962, concerning the production of trialkyl aluminum compounds by the interaction of aluminum, olefins and hydrogen, the cost and other factors involved in the practice of this method are still not sufficiently favorable.

One object of the invention concerns the production of alkyl aluminum compounds in a simplified manner.

This, and further objects of the invention, will be seen from the following description, one of the preferred embodiments of the invention being illustrated in the accompanying flow sheet.

In accordance with the invention, aluminum, aluminum triakyl and hydrogen are reacted at a pressure in excess of 20 atmospheres and the resulting dialkyl aluminum hydride or its solution in aluminum trialkyl may be either separated as such or may be further treated with olefins to yield aluminum trialkyl. It is thus possible, when using the two steps procedure, to obtain from aluminum trialkyl in simple and effective manner further amounts of aluminum trialkyl.

When heating aluminum with an aluminum trialkyl and hydrogen under pressure an amount of hydrogen equivalent to the aluminum is absorbed by the mixture and there is formed dialkyl aluminum hydride in accordance with the following formula:

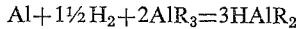

$$Al + 1\tfrac{1}{2} H_2 + 2AlR_3 = 3HAlR_2$$

It is thus seen that by the addition of aluminum and hydrogen three mol of dialkyl aluminum hydride are formed for every two aluminum trialkyl submitted to the reaction. The three mol of alkyl aluminum compound are present, as stated, in the form of dialkyl aluminum hydride which by the simple expedient of olefin addition can be converted into the trialkyl aluminum product or may be used as such. The dialkyl aluminum hydrides are generally considerably more stable against heat than aluminum hydride itself which literally decomposes at temperatures below 100° C., into aluminum and hydrogen.

The reaction of the aluminum with the aluminum trialkyl and hydrogen is preferably carried out with aluminum in finely subdivided form. It is thus expedient to, for instance, grind aluminum shot or particled aluminum prior or during the reaction or to use molten aluminum as the starting material for obtaining aluminum in finely subdivided form. By far the most effective method for the conversion of the aluminum into a finely dispersed, highly reactive condition is the dispersion or atomization of molten aluminum by way of an inert gas stream under pressure projecting or propelling the molten aluminum directly into the liquid aluminum trialkyl.

With the technical aids available today, such a method can be completely controlled and is readily executable despite the spontaneous combustibility of the aluminum trialkyls such as particularly of aluminum triethyl. It is, however, ordinarily preferred to avoid the use of concentrated pure aluminum trialkyl in the first stage of the method. For that reason, it is of advantage not to atomize or project the molten aluminum directly into pure or highly concentrated aluminum trialkyl, but rather into an indifferent or inert solvent with respect to the aluminum trialkyl, the solvent to preferably already contain 3 to 10% of dissolved aluminum trialkyl. Suitable solvents of this type are, for instance, saturated hydrocarbons of the aliphatic type such as hexane or hydrocarbons of the aromatic type such as benzene. The olefins which may be used for the second reaction stage, if conversion to trialkyl aluminum compounds is desired, cannot be used as such for solvent purposes in connection with the first reaction stage producing the dialkyl aluminum hydride products because such olefins will interfere with the production of the dialkyl aluminum hydrides. Further the solvent should be preferably so selected that the same has an appreciable boiling point differential with respect to the aluminum trialkyl and preferably a boiling point at least 50° C. higher or lower than that of the aluminum trialkyl.

When using the molten aluminum atomization method, it is desirable to circulate the liquid into which the aluminum is projected at a relatively rapid rate. Using such circulatory system it is of advantage to project the aluminum into the liquid at a given point and so control the circulation that a settling of the atomized aluminum will occur at another point within the cycle. It is then possible to obtain within the region of such a settling zone a relatively viscous suspension containing large amounts of aluminum. Thus for instance when circulating in the atomization circulatory system a solution which contains, for example, at the point of aluminum projection, about 5% by weight of aluminum, a thick suspension of aluminum of up to 30% by weight may be continuously withdrawn by way of a pressure pulp pump or similar device. This heavy suspension may then be further used.

In lieu of using atomized molten aluminum it is also possible to obtain an aluminum activated in a different manner as, for instance, an aluminum activated as set forth in copending application U.S. Serial No. 484,576 by mechanical comminution under avoidance of the formation of a passive oxide layer upon the active surface or which has been activated by a chemical treatment with dialkyl aluminum monohalogenides.

The reaction between aluminum, aluminum trialkyl and hydrogen is advantageously carried out at a temperature between 80 and 200° C. and preferably between 100 and 150° C. at pressures of at least 20 atmospheres and preferably at least 60 atmospheres. The upper limit of the pressure is primarily one of practical application determined by the structural features of the appaartus. In most cases, however, a top pressure of 250 atmospheres is applicable.

The liquid reaction product obtained in the first stage of the reaction may then be worked up for the recovery, if desired, of dialkyl aluminum hydride or the same may be further treated for the production of aluminum trialkyls utilizing olefins.

In this case it is possible, in accordance with one embodiment of the invention, and preferably when using ethylene or monosubstituted ethylenes to effectuate the action of hydrogen upon the aluminum in the presence of aluminum trialkyls and the olefin addition in separate stages. In that event the reaction of the olefins with the dialkyl aluminum hydrides is effectuated under appreciably milder conditions than is the hydrogen absorption. The reaction temperature in the addition or olefin reaction stage is advantageously from 50 to 80° C. and preferably 60 to 65° C. By utilizing this means of operation it is avoided that olefin and hydrogen will come together in a single reaction mixture so that side reactions which may lead to saturated hydrocarbons cannot take place.

In accordance with another embodiment of the invention, the reaction product of the first reaction stage, i.e., the formation of dialkyl aluminum hydrides, is directly treated with olefins. In this case, aluminum is first heated with aluminum trialkyls under hydrogen pressure and the olefin is then pressed in at temperatures of about 110 to 120 C. The pressure feeding of the olefin is advantageously carried out at such a rate of speed that the olefin concentration within the reaction mix is at all times very low. Under these circumstances the reaction mix will contain ordinarily during the reaction a certain amount of free dialkyl aluminum hydride. It has been found desirable for smooth and expeditious operations, in accordance with the invention, to deliberately so adjust conditions that there is always present in the reaction mix some free dialkyl aluminum hydride. This is readily secured by adjusting or controlling the weight of addition of the olefin and may be easily supervised or controlled by way of samples withdrawn under nitrogen and testing the sample with isoquinoline which, in the presence of dialkyl aluminum hydride, causes the appearance of a red coloration. This test is very sensitive.

The reaction products obtained and still containing at least small amounts of free dialkyl aluminum hydride may then be converted by adjustment of the olefin addition and pressure feeding of additional hydrogen into pure dialkyl aluminum hydrides or by the addition of increased amounts of olefins into pure aluminum trialkyls.

The olefin pressure may vary within wide limits. Thus, for instance, when using ethylene it is readily possible to ue atmospheric pressure. The important thing is that a certain interrelation exists between the temperature which is preferably maintained during the olefinization and the olefin pressure as well as the desired volume-time-yield which occurs. Ordinarily, again exemplifying the use of ethylene, the ethylene pressure does not need to exceed 10 to 20 atmospheres and a temperature of 50 to 80° C. usually suffices. If, however, the temperature is incerased to about 90 to 100° C. the simple passage of ethylene through the reaction mix at normal pressure will be sufficient.

In commercial operations, the production of aluminum trialkyls in accordance with the invention is most advantageously effected in a recycling procedure which is hereafter exemplified in connection with Example 6. Though it is there shown by way of a specific production of aluminum triethyl, this procedure is equally applicable to other olefins as is readily apparent. In the utilization of this recycling procedure, there are preferably used two pressure reaction towers which are suitably combined. In the first tower the reaction between aluminum, aluminum triethyl and hydrogen is effected. The liquid reaction product is then passed into the second reaction tower of the pressure type in such manner that as little as possible, and preferably no hydrogen, passes into this second tower. Portions of the metallic aluminum, however, may be passed into the second reaction tower without causing any difficulty with respect to the therein contemplated olefin reaction. In this second tower the reaction mix is brought into contact with the olefin and in the specific case with ethylene whereby the aluminum diethyl hydride is converted to aluminum triethyl. The newly formed aluminum triethyl is then continuously withdrawn from the second tower. It is of advantage to synchronize this withdrawal of the newly formed aluminum trialkyl with the continuous aluminum feed in the first reatcion tower. In the practical operation of such a recycling procedure, and especially when utilizing substantially pulverized or atomized aluminum it is of advantage to carry in the cycle more liquids be it aluminum trialkyl or its solution in an indifferent solvent, than is ultimately necessary for the subsequent reaction of the aluminum itself. It is for that reason, in such a recycling procedure preferred to first feed the entire amount of liquid which exits from the second reaction tower into the cycle for the production of the atomized aluminum and to then withdraw at a suitable point, from this last mentioned cycle, the continuously formed aluminum triethyl. The metallic aluminum is recycled into the first reaction tower by way of a pump suitable for the feeding of pulpy materials. A second pump presses so much pure aluminum triethyl into the first tower as is necessary for the obtaining of a smooth reaction.

If operations are conducted in the presence of solvents, the reaction product from the second reaction tower is separated by distillation into solvent and aluminum triethyl. The solvent is then again provided with a few percent of aluminum triethyl. Alternatively it is possible, by suitable adjustment of the distillation, to obtain a solvent containing the desired or required amount of aluminum triethyl concentration. The solution of the aluminum triethyl is then recycled into the atomization cycle. The triethyl exiting from the second reaction tower may be partially passed into the first reaction tower by way of a suitable feed pump.

The invention offers the following practical and technical advantages:

In previously proposed methods for the production of dialkyl aluminum hydrides it was only possible to obtain dialkyl aluminum hydrides of the type of aluminum diisobutylhydride with relative ease of their production because these materials may be more or less readily obtained from compounds of the type of aluminum triisobutyl by the direct splitting off of isobutylene while heating. In accordance with the invention, however, it is possible to also obtain very readily dialkyl aluminum hydrides if the same carry in alpha position non-branched and especially primary aliphatic constituents.

Furthermore, the procedure, in accordance with the invention, constitutes an appreciable advance in the production of certain aluminum trialkyls. The previously proposed preparation of aluminum trialkyls from aluminum, hydrogen and olefins, will only proceed relatively smoothly with branch-chain hydrocarbons of the type of isobutylene. When using ethylene and singly substituted ethylenes, difficulties are experienced in the practice of the method because the same must be carried out under conditions at which ethylene and singly substituted ethylenes will further react with the aluminum trialkyls which have formed as reaction products.

In the production of the aluminum trialkyls, in accordance with the invention, it is of advantage to make use of the following:

Since at the beginning of the reaction, in accordance with the invention there are present at least two molecules of aluminum trialkyl for each gram-atom aluminum metal and since after the addition of the olefin to the resulting reaction products, there are returned three molecules of aluminum trialkyl, it is possible to produce, by a repetition of the reaction sequence, any desired amounts of aluminum trialkyl from any specific starting amount of such materials.

Thus, by proceeding in this manner, it is possible to obtain simply and smoothly trialkyl aluminum compounds by a reaction which, once started, basically involves the use of aluminum, olefine and hydrogen. Thus, from aluminum, propylene and hydrogen, aluminum tripropyl is very readily, smoothly and economically obtained, the propylene being added under pressure in liquid form. In an analogous manner there may be obtained from aluminum, ethylene and hydrogen, with excellent yields, aluminum triethyl. Also other alpha olefins may be used in a similar manner yielding, in accordance with the invention, high amounts of aluminum trialkyls. The number of carbon atoms, as to any alkyl which is to be added to the aluminum to constitute a trialkyl compound to be made in accordance with the invention, is not critical and as high as 20 carbon atoms are readily obtainable by way of the alkyl radicals attached to the aluminum.

*Example 1*

90 grams of aluminum shot (10 gram equivalents) are wet-ground with 6 mol (=684 g.) aluminum triethyl for 24 hours in a ball mill filled with nitrogen. The resulting suspension is thereafter passed into a 2 liter autoclave filled with nitrogen and thereafter about 250 atmospheres of hydrogen are pressed in. While heating to a temperature of about 100 to 110° C., while shaking or rotating the autoclave, the pressure reduces within a period of about 3 to 4 hours down to about 80 atmospheres. If the hydrogen pressure does not further reduce, the autoclave is permitted to cool and the hydrogen is depressurized. Thereupon the liquid contents of the autoclave are withdrawn under nitrogen. The reaction mass is of a dark coloration because of impurities of the aluminum used and because of small amounts of unreacted aluminum. The reaction product may be easily freed from these impurities by distillation, centrifuging or filtration. Upon distillation in high vacuum there are obtained 700 grams of almost pure diethyl aluminum hydride (boiling point 45–50° C. at $10^{-3}$ mm. Hg) which contains only little aluminum triethyl.

*Example 2*

Molten aluminum, running out of a nozzle, is first atomized with a blast of an indifferent gas such as nitrogen, the atomized spray being propelled or projected into aluminum tripropyl to thereby obtain a suspension of finely dispersed aluminum with a highly active surface. This suspension is adjusted to an aluminum content of about 10% by weight by removal of a portion of the aluminum tripropyl. 100 grams of the 10% aluminum suspension are then passed into a nitrogen filled autoclave of 500 cc. content. Thereafter hydrogen is pressed into the autoclave at a pressure of 60 atmospheres whereupon the autoclave is heated to a temperature of 125–130° C. while the same is shaken or rolled. The pressure will reduce within a period of 6 to 7 hours down to about 30 atmospheres. After cooling the hydrogen is depressurized. The liquid reaction product is thereafter withdrawn under suitable precautions, such as under nitrogen, from the autoclave, is thereafter first freed in vacuum from the dissolved hydrogen and is finally distilled in a high vacuum. There are obtained about 100 grams of practically pure dipropyl aluminum hydride constituting a substantially colorless self-igniting liquid.

*Example 3*

A suspension of 30 grams finely dispersed aluminum in 1070 grams of aluminum tridodecyl are prepared in the manner set forth in Example 1 or 2 whereupon a suspension is passed into an autoclave of 2 liter content and filled with nitrogen. About 100 atmospheres hydrogen are pressed in and the autoclave is heated to about 110–115° C. while being shaken or rolled. Within several hours the hydrogen pressure is reduced to about 40 atmospheres. If no further pressure reduction occurs, one permits cooling to about 50° C., whereupon the hydrogen is depressurized and the liquid contents, having a temperature of about 40 to 50° C. are permitted to pass out of the autoclave. The impurities resulting from the original aluminum used and also from remanants of unreacted aluminum are filtered (always under nitrogen) while the reaction mix is stirred warm and there is thus obtained in the filtrate a liquid which substantially solidifies upon cooling to about 10–20° C. and which, upon heating, again melts between about 35 and 40° C. This material shows on analysis 7.3% aluminum (calculated for $(C_{12}H_{25})_2AlH=7.4\%$. Al). Upon decomposition with water, the material liberates per 0.366 (=1 millimol) the correct amount of 22.4 ccm. hydrogen.

*Example 4*

A suspension of 30 grams finely dispersed aluminum in 50 grams of aluminum trimethyl is obtained similar to the manner described in Example 1 or 2 and the resulting suspension is thereafter passed into an autoclave of 500 ccm. contents and filled with nitrogen. After the pressing in of 250 atmospheres of hydrogen, the autoclave is heated to about 120 to 130° C. while shaking or rolling the same. Within a few hours the pressure reduces to about 120 atmospheres. Upon the completion of the reaction, which may be seen from the fact that the hydrogen pressure does not further reduce, one permits cooling to about 50° C. whereupon the hydrogen is depressurized. Thereafter the, at about 50° C., still relatively thinly liquid dimethyl aluminum hydride is permitted to flow off under nitrogen. At room temperature the reaction product constitutes a very viscous liquid which may be separated from impurities by distillation in vacuo (boiling point 60–61° C. at 16 mm. Hg); there are obtained about 163 grams dimethyl aluminum hydride.

*Example 5*

A suspension of about 150 grams aluminum in about 2 kilograms of aluminum triisobutyl prepared in the manner set forth in Example 1 or 2 whereupon the suspension is passed into a 5 liter autoclave filled with nitrogen. Reaction is effected at a temperature of about 110 to 115° C. with hydrogen under 100 atmospheres pressure. After about five to six hours, the hydrogen pressure reduces to about 20 atmospheres. The hydrogen is now depressurized and the liquid reaction product is flashed off with the nitrogen from the autoclave and upon removal of still undissolved hydrogen the resulting product is distilled in a high vacuum (boiling point 105° C./$2\times10^{-1}$ mm. Hg). There are obtained about 2.1 kg. of pure diisobutyl aluminum hydride.

*Example 6*

In this example a continuous commercial method is illustrated in conjunction with the accompanying flow sheet:

The molten aluminum is atomized from the storage tank 1 into tank 2 in which there is a solvent which is passed into the same through the conduits 3 and 4. The solvent passed through conduit 3 contains a small amount, such as 5%, aluminum triethyl. The mixture of finely atomized aluminum and solvent layers in the settling tank or zone 5 into a fixed suspension containing up to about 30% by weight of aluminum and an almost pure solvent which may be recycled by way of the pump 6 and conduit 4 into the atomizing tank 2. The aluminum suspension is then passed by way of the pulp type pump 7 into the lower portion of tower I by way of the conduit 8. Hydrogen is passed into the reaction tower I by way of the conduit 9 and so much aluminum triethyl is passed into the reaction tower I by way of pump 10 and conduit 11 as is required for effecting of a desired reaction in tower I. The reaction product in tower I then passes through conduit 12 into a separator 13 in which the balance of hydrogen is removed through conduit 14, the same being then passed through conduit 9 for reentry into the cycle. The diethyl aluminum hydride passes through conduit 15 into the lower portion of the reaction tower II in which simultaneously ethylene was introduced by way of conduit 16. The reaction product of tower II then passes by way of conduit 17 into a distillation column 18 in which the product is separated into unreacted ethylene solvent and aluminum triethyl. The unreacted ethylene may be drawn off by way of the conduit 19 and may be passed back into the cycle. The solvent may be returned by way of conduit 3 through the atomizing tank of zone 2. The principal portion of the aluminum triethyl is drawn off by way of conduit 20 while an appropriate portion is passed back into the reaction tower I by way of conduit 21, pump 10 and conduit 11. It is also possible to so adjust a control of the distillation in the distillation column that the solvent which is removed by way of the conduit 3 already contains that amount of aluminum triethyl which is desired for the aluminum triethyl content of solvent in the atomization tank or vessel 2. It is, however, also possible to withdraw substantially pure solvent and to thereafter add the desired amount of aluminum triethyl.

The solvents that may be used are, for instance, hexane or benzene. However, any other solvents may be employed in the practice of this or the other examples herein set forth utilizing solvents provided the solvent is a solvent for the particular trialkyl aluminum utilized in the process and is, at the same time, substantially indifferent or inert with respect to the particular trialkyl aluminum compound, i.e., will not cause the decomposition thereof.

*Example 7*

800 grams of aluminum shot are ground under nitrogen in a ball mill together with two liters of a 10% solution of aluminum tripropyl and hexane for 12 hours, whereupon the resulting very uniform and readily flowing suspension was transferred under nitrogen into a 13 liter roller autoclave. The metallic aluminum was first permitted to settle in the autoclave whereupon the predominant portion of the liquid suspension agent was removed by suction. A further 400 grams of aluminum were then ground with the removed suspension agent in the same ball mill under similar conditions in order to obtain further amounts of suspension which are then passed into the same autoclave so that the same contains 1200 grams of aluminum finely suspended in about two liters of the suspension agent. For a still better utilization of the autoclave content, the aluminum is again permitted to settle and one half of the liquid suspension agent is drawn off and a further 200 ccm. of aluminum tripropyl there added. Hydrogen was then fed in under pressure at 200 atmospheres at room temperature whereupon the autoclave was heated to a temperature of 110 to 120° C. while the autoclave was being rotated. The pressure in the autoclave amounted to 240 atmospheres. After the temperature of 110 to 120° C. was reached, the motion of the autoclave was arrested and, by way of a pressure pump, 300 grams liquid propylene were pressed into the autoclave and the same was thereafter again placed into rotation. The temperature will temporarily reduce somewhat. The temperature reduction is compensated by again bringing the same to 110 to 120° C. and heating is continued for 30 minutes with continuous rotation of the autoclave. Thereupon the addition of liquid propylene under pressure is repeated in the manner above described. About commencing with the second or third propylene addition, a temporary increase and then decrease of the pressure down to the original pressure value is observed. At this point, it is possible to commence with the addition of the next following propylene portion. The total pressure in the autoclave will not appreciably reduce although hydrogen is being consumed because the free gas volume within the autoclave becomes continuously smaller by reason of the increase of the liquid contents. The pressure increase and decrease is solely caused by pressure feeding of the propylene and the consumption of the propylene by the reaction. The reaction may be continued up to practically the complete consumption of the aluminum. Only then will a further pressure decrease not occur even with the pressure feeding of additional propylene. Thereafter the autoclave is permitted to cool and the same is emptied under nitrogen and the liquid reaction product is freed from the still undissolved propylene and small amounts of a few percent of dimer-propene and of hexane. The distillation in vacuo will then yield a completely uniform and pure aluminum tripropyl having a boiling point of 64°/0.2 mm. in amount of 6.5–7 kg. With the complete dissolution of the aluminum, at the most 7 kilograms could be formed. The final reaction product of course also still contains the initially added aluminum tripropyl to an extent of about 250 grams so that in the course of the present example, the actually newly formed amount of aluminum tripropyl is about 6.5 to 6.75 kilograms.

*Example 8*

Two liters of a hydrocarbon mixture derived from the cracking in accordance with Fischer-Tropsch-Gatsch and having a boiling range of 165–220° C. with an alpha olefin content of 3 mol per liter are admixed with 350 grams of aluminum triisobutyl and so much benzene that the boiling point of the mixture is 110–115° C. The mixture is then boiled under reflux and the amount of liberated isobutylene is measured. After several hours the correct amount of 250–280 grams of isobutylene has been liberated and the alpha olefins have been converted into the corresponding aluminum trialkyl mixtures which will also contain additionally the paraffin portion of the original cracking products as well as the non-alpha olefins and a remainder of the excess of the originally present alpha olefins. There is then added 4 liters of air-free and dry hexane and the mixture is filled under nitrogen into a ball mill together with 2 kilograms of aluminum shot. The grinding is carried out as described in Example 7 for 12 hours and there is thusly obtained a uniformly flowing suspension of aluminum in a solution of higher aluminum trialkyls in hexane. The entire mixture is passed into a substantially vertically arranged reactor of the pressure type of about 15 centimeters inner diameter and about 4 meters high. The reactor is provided with means permitting the pumping in of liquid cracking hydrocarbons as well as of pulpy aluminum suspension with the aid of a pulp type pump and further permits the withdrawal of samples. The autoclave is filled with hydrogen under 100 atmospheres pressure and the hydrogen is then circulated with the aid of a circulating pump in such manner that the same will enter the reactor at the lower portion and will stir up the aluminum being then again passed out of the upper end. The reactor is first heated for about one half hour to a temperature of about 120° C. whereupon liquid cracked olefins are pressed into the same with the aid of an injection pump, these olefins being the same or of the same type initially admitted to the reactor. Under the conditions stated, the reacting olefin, as can be readily calculated, will absorb less hydrogen than corresponds to the volume of the pressed in liquid olefin so that the pressure will not reduce during the continuance of the reaction in the apparatus but will rather increase. It is in such cases necessary to provide, in the event the pressure increase becomes too high, for a depressurization of a portion of the hydrogen in a suitable storage tank.

In the particular arrangement described in this example, it is not readily possible to observe the initiation and continuance of the reaction by way of pressure changes. It is nevertheless, however, easily feasible to control and supervise the reaction by withdrawing, under nitrogen, small amounts of samples and to test the same with isoquinoline. The olefin addition is then so regulated that the samples will always assume a distinctly yellow coloration upon the addition of isoquinoline. It will be observed that some time after an olefin addition, the color of a sample will be more intense and there is then always added so much olefin that the color will almost, but not quite, disappear. The aluminum present in the reactor is completely sufficient to convert a complete reactor charge of the starting olefins into aluminum trialkyl.

If so much of the cracked olefins have been added to the reactor under pressure that the reactor is practically filled, the circulatory pump for the pressure hydrogen is then set still—always maintaining the reaction temperature—whereupon the reaction mixture is permitted to remain quiescent in the reactor for a short period of time so that the aluminum residues have a chance to settle whereupon most of the liquid reactor contents are withdrawn under depressurization into a tank or other container filled with nitrogen. The liquid reaction product obtained in this manner contains, per liter, about 25 to 30 grams of bound aluminum. A portion of this reaction product is used for the production of a new aluminum suspension in the ball mill or liquid aluminum is atomized as described in Example 6 with the device there set forth into the reaction product in such manner that an approximately 10% aluminum containing readily flowable liquid and readily pumpable suspension is obtained. This suspension is then passed into the reactor by way of a pulp type pump, the temperature of reaction having been substantially maintained in that reactor, there being restarted at the same time the hydrogen cycle and the pump feeding of the olefin. It will be readily seen that when pump feeding is 10% aluminum suspension and a content in the reaction product of 2.5% of dissolved aluminum, approximately 4 times the amount of the pump fed suspension volume of olefin can be added. It is then possible very soon, whenever the reactor is again filled with reaction products, to continuously withdraw liquid reaction product at the upper end, advantageously by way of a built-in pressure filtration arrangement designed for retaining of aluminum. In this manner the entire process may be maintained as a continuous operation by continuously diverting a portion of the liquid reaction product in order to produce new aluminum suspension.

*Example 9*

2 kilogram aluminum shot are charged into a 13 liter roller type autoclave whereupon the autoclave was filled with nitrogen and thereafter for the wetting of the aluminum there being added a just sufficient amount of about 220 ccm. of ethyl-aluminum sesquibromide which may be readily obtained by dissolving aluminum shot in ethyl bromide. Thereafter there is at first carefully pressure fed into the autoclave 200 ccm. of liquid ethyl chloride and the autoclave, while observing its inside temperature, is then rotated without applying external heat. After some time the aluminum reacts with the ethyl chloride which is observable by a temperature increase. If the temperature has again come down, two further portions of 200 grams each of ethyl chloride are added and in each case the end of the reaction is awaited. By then a certain amount of surface reacted, or surface activated, aluminum as well as a certain amount of sesquibromide containing ethyl aluminum sesquichloride has formed which is, as far as possible, removed from the autoclave. Thereafter about 500 grams of aluminum triethyl are added and hydrogen is pressure fed similar to the procedure described in Example 7, the hydrogen being pressed in at a pressure of 200 atmospheres whereupon heating is effected to a temperature of about 110°–120° C. After heating for about one half hour there is at first a small amount of approximately 50 to 100 grams of ethylene admitted into the autoclave from a tank charged with high pressure ethylene whereupon rotation is continued for approximately another 20 minutes, the procedure being thereafter repeated with respect to alternating rotaiton of the autoclave while heating the same and the addition of ethylene whereby the amount of the individual ethylene additions may be increased commensurate with the progress of the reaction. Perhaps at the end of the procedure it is of advantage to pressure feed once more hydrogen into the autoclave. If a sufficient amount of ethylene has been added as will correspond to the formation of about 10 liters, i.e., 8 kilograms of liquid aluminum triethyl, it is of advantage to interrupt the process in order to avoid the very dangers inherent in the overcharging of a pressure vessel. Thereafter the autoclave is permitted to cool and the same is depressurized, whereupon the autoclave contents are withdrawn under nitrogen. Upon distillation in vacuo about 8 kilograms of aluminum triethyl corresponding to the fed-in ethylene are obtained. This aluminum triethyl contains small amounts of diethyl aluminum halogenide derived from the original activation of the aluminum. For many uses of the aluminum triethyl such halogen content is not detrimental.

It will be noted that in the above Example 6 an illustration is furnished of a general flow arrangement for continuous operations in accordance with one of the preferred embodiments of the invention. Inasmuch, however, as this arrangement is applicable to the reaction conditions generally applying for the first trialkyl conversion and second olefin addition reaction, regardless of whether the same are carried out as continuous or batch operations, specific values of temperatures and pressures have not been included in Example 6, it being understood that any of the conditions applying within the scope of this invention, and specifically those set forth in connection with the various other examples herein furnished, necessarily apply to the continuous operations of Example 6.

Whenever mention herein is made in connection with a finely sub-divided aluminum as offering or having an "active surface," or where such similar designation is used, it is intended to cover thereby, as is well understood, a reactive aluminum surface of the type set forth herein, as for example, obtained by solvent grinding or by other mechanical comminution of aluminum under the conditions herein set forth and including activation with such activating agents as dialkyl monohalogenides. Such designation is also intended to include the preferred embodiment of sub-divided aluminum obtained by atomization of molten aluminum into an organic solvent. It is in all cases understood that the organic solvents, wherever used in connection with the obtaining of a finely sub-divided aluminum having or offering an "active surface" are such as will be inert with respect to aluminum and in their specific application to the present invention will be solvents for the aluminum trialkyl used in the invention and will be inert with respect thereto.

We claim:

1. In the production of dialkyl aluminum hydride by reaction between aluminum, aluminum trialkyl and hydrogen, the improvement which comprises atomizing aluminum from molten condition into aluminum trialkyl and subjecting the resulting mixture to said reaction.

2. The improvement according to claim 1, in which said aluminum is first atomized from molten condition into a solvent for said aluminum trialkyl and inert thereto and containing substantially dissolved therein 3–10% aluminum trialkyl, and in which the resulting suspension of atomized aluminum is reacted with hydrogen and additional trialkyl aluminum.

3. The improvement according to claim 1, in which at least a part of said aluminum is continuously atomized from molten condition into an organic liquid being a member of the group consisting of aluminum trialkyl and aluminum trialkyl solution in an organic solvent, said solvent being inert with respect to said aluminum trialkyl, in which the suspension of atomized aluminum is continuously passed to a settling zone, in which settled aluminum enriched suspension is continuously withdrawn from said settling zone, in which aluminum-impoverished aluminum trialkyl is continuously returned from said settling zone to the area of molten aluminum atomization, and in which said enriched suspension is continuously passed to said reaction zone.

4. The improvement according to claim 3, in which said organic liquid into which said molten aluminum is atomized is a solution in said solvent of about 3-10% aluminum trialkyl.

5. The improvement according to claim 4, in which the product resulting from said reaction is subjected to separation of said solvent and the recovery of an aluminum trialkyl portion to be continuously returned to said reaction and in which at least a portion of said separated solvent is continuously returned in the form of a solution therein of about 3-10% of aluminum trialkyl to the said solution into which said molten aluminum is atomized.

6. The improvement according to claim 5, in which said solvent separation is conducted to continuously yield about 3-10% aluminum-trialkyl-containing solvent in amount sufficient to continuously correspond to the amount of such solvent solution continuously passed out of said settling zone in the form of said enriched suspension, and in which said separated aluminum trialkyl solution is continuously added to said solution into which said molten aluminum is atomized.

7. In the production of alkyl aluminum hydride by reaction between aluminum, aluminum trialkyl and hydrogen, the improvement which comprises atomizing aluminum from molten condition into aluminum trialkyl and subjecting the resultant mixture to said reaction in proportionate amounts sufficient to yield dialkyl aluminum hydride.

8. Method for continuously producing aluminum trialkyl which comprises continuously atomizing metallic aluminum into aluminum trialkyl in a confined metal-into-liquid atomization zone, continuously passing the resulting metallic aluminum suspension into a settling zone, continuously cycling aluminum trialkyl from the upper portion of said settling zone to said atomization zone, continuously passing aluminum suspension and aluminum trialkyl from said settling zone through a first reaction zone in contact with hydrogen at a temperature of about 80 to 200° C. and a pressure of about 60 to 250 atmospheres, continuously removing reaction products from the material exiting said first reaction zone, continuously removing hydrogen from said reaction products, thereafter continuously passing the products so treated through a second reaction zone in contact with an olefin at a temperature of about 50 to 80° C. and at a pressure of about atmospheric to 20 atmospheres, continuously subjecting the reaction product exiting from said second reaction zone to the removal therefrom of aluminum trialkyl and continuously passing a portion of the substantially solvent-free reaction product to said first reaction zone.

9. Method according to claim 8, in which said aluminum trialkyl separation is effected by a distillation column and in which separated aluminum trialkyl is returned to said atomization zone.

10. In the production of dialkyl aluminum hydride by reaction between aluminum, aluminum trialkyl and hydrogen, the improvement which comprises atomizing aluminum from molten condition into an organic liquid comprising an inert solvent for aluminum trialkyl to be used in the reaction, and subjecting the resulting suspension to reaction with aluminum trialkyl and hydrogen.

11. Improvement according to claim 10 in which said aluminum is substantially continuously atomized from molten condition into said organic liquid, the suspension of atomized aluminum continuously passed to a settling zone, the settled aluminum enriched suspension continuously withdrawn from said settling zone and continuously passed to a reaction zone for reaction with aluminum trialkyl and hydrogen, and in which aluminum impoverished solvent is continuously returned from said settling zone to the area of molten aluminum atomization.

References Cited by the Examiner

UNITED STATES PATENTS

| | | | |
|---|---|---|---|
| 2,366,309 | 1/45 | Batchelder et al. | 23—263 |
| 2,373,646 | 4/45 | Binnington | 23—263 |
| 2,765,329 | 10/56 | Lindsey | 260—448 |
| 2,787,626 | 4/56 | Redman | 260—448 |

FOREIGN PATENTS 535,235  2/55  Belgium.

TOBIAS E. LEVOW, *Primary Examiner.*

UNITED STATES PATENT OFFICE
CERTIFICATE OF CORRECTION

Patent No. 3,207,772                            September 21, 1965

Karl Ziegler et al.

It is hereby certified that error appears in the above numbered patent requiring correction and that the said Letters Patent should read as corrected below.

Column 3, line 9, after "appreci" insert a hyphen; line 47, for "ue" read -- use --; column 6, line 10, for "$(C_{12}H_{25})_2$ AlI=7.4%. Al)" read -- $(C_{12}H_{25})_2$ AlH=7.4% Al) --; line 33, for "163" read -- 165 --; column 9, line 52, for "220" read -- 200 --; column 10, line 3, for "rotaiton" read -- rotation --.

Signed and sealed this 26th day of July 1966.

(SEAL)
Attest:

ERNEST W. SWIDER                            EDWARD J. BRENNER
Attesting Officer                                 Commissioner of Patents